US011691089B2

United States Patent
Zhang et al.

(10) Patent No.: US 11,691,089 B2
(45) Date of Patent: Jul. 4, 2023

(54) VACUUM RECTIFICATION TOWER WITH SATELLITE-TYPE TOWER KETTLE AND VACUUM RECTIFICATION METHOD FOR ATMOSPHERIC PRESSURE RESIDUAL OIL

(71) Applicants: BEIJING JIESENCHUANGXIN SCIENCE & TECHNOLOGY DEVELOPMENT CO. LTD., Beijing (CN); Qikai Zhang, New Maryland (CA)

(72) Inventors: Qikai Zhang, New Maryland (CA); Penghui Xu, Dongying (CN); Qun Gao, Beijing (CN)

(73) Assignees: BEIJING JIESENCHUANGXIN SCIENCE & TECHNOLOGY DEVELOPMENT CO. LTD., Beijing (CN); Qikai Zhang, New Maryland (CA)

( * ) Notice: Subject to any disclaimer, the term of this patent is extended or adjusted under 35 U.S.C. 154(b) by 0 days.

(21) Appl. No.: 17/333,043

(22) Filed: May 28, 2021

(65) Prior Publication Data

US 2022/0305400 A1 Sep. 29, 2022

(30) Foreign Application Priority Data

Mar. 24, 2021 (CN) .......................... 202110315815.9

(51) Int. Cl.
*B01D 3/10* (2006.01)
*B01D 3/14* (2006.01)
*C10G 7/06* (2006.01)

(52) U.S. Cl.
CPC ............. *B01D 3/101* (2013.01); *B01D 3/106* (2013.01); *B01D 3/14* (2013.01); *C10G 7/06* (2013.01)

(58) Field of Classification Search
CPC .......... B01D 3/10; B01D 3/101; B01D 3/108; B01D 3/14; C10G 7/06
See application file for complete search history.

(56) References Cited

FOREIGN PATENT DOCUMENTS

CN 1532179 A * 9/2004 ............. B01D 3/322

OTHER PUBLICATIONS

English machine translation of CN 1532179, Copyright Clarivate Analytics. (Year: 2004).*

* cited by examiner

*Primary Examiner* — Renee Robinson
(74) *Attorney, Agent, or Firm* — Gang Yu

(57) ABSTRACT

Provided are a vacuum rectification tower with a satellite-type tower kettle and a vacuum rectification method for atmospheric pressure residual oil. The vacuum rectification tower includes a satellite-surrounded vacuum tower kettle and a rectifying section; the satellite-surrounded vacuum tower kettle includes a main tower kettle and a plurality of sub-reactors arranged outside the main tower kettle in a satellite-surrounded mode; the main tower kettle is provided with a first outlet and a plurality of spray inlets, and a top portion of the main tower kettle has an opening; the sub-reactor is provided with a second outlet and a first inlet, the spray inlets are connected with the second outlets of each sub-reactor in a one-to-one correspondence, and the first outlet is connected with the first inlets. The above vacuum rectification tower is used for treating the atmospheric pressure residual oil, and an extraction rate of light oil may be effectively improved under relatively mild temperature and pressure environment.

20 Claims, 3 Drawing Sheets

VACUUM RECTIFICATION TOWER WITH SATELLITE-TYPE TOWER KETTLE AND VACUUM RECTIFICATION METHOD FOR ATMOSPHERIC PRESSURE RESIDUAL OIL

TECHNICAL FIELD

The disclosure relates to the technical field of petrochemical industries, and in particular to a vacuum rectification tower with a satellite-type tower kettle and a vacuum rectification method for atmospheric pressure residual oil.

BACKGROUND

It is well-known that an atmospheric vacuum system of a refinery plant is a leading process of the refinery plant and even a refining industry. Process connection often referred to as "three-tower two-furnace" in the atmospheric vacuum system of the refinery plant is: primary fractionating tower→atmospheric furnace→atmospheric tower→vacuum furnace→vacuum tower. This process may distill out 70-80% of raw materials required in refining and chemical industries, so the atmospheric vacuum system is one of the most important processes in the refinery plant.

However, since the beginning of this century, with the deepening of oil exploitation, components of produced crude oil are heavier and heavier. The crude oil is heavy and inferior, and shale oil, oil sand oil, heavy (thickened) oil, superheavy oil, deep petroleum and unconventional heavy low-quality oil such as asphalt and coal tar are massively produced, so that a working condition of the refinery plant is continuously descended, and the efficiency of a distillation system of the refinery plant is greatly reduced. In the middle of last century, an atmospheric tower of the refinery plant may distill out 50~70% of straight-run gasoline and diesel from the crude oil. Now, because only the inferior crude oil is obtained in many refinery plants, the atmospheric towers thereof may only distill out 10~30% or even a lower proportion of straight-run fuel oil from the crude oil. The reduction of the straight-run fuel oil may inevitably bring about a sharp increase of atmospheric residual oil and vacuum residual oil in the refinery plant, and a final result thereof is that the pressure on the refinery plant to treat the heavy oil is increased and the benefit is reduced.

At present, heavy oil reserves account for more than 50% of workable crude oil reserves in the world. The heavy oil causes a petroleum industry to face severe problems in extraction, transportation and treatment from upstream to downstream, and oil refining enterprises also face triple pressures of heavy and low-quality raw materials, light and environment-friendly requirements in products, and clean and low-carbon requirements in production processes.

Based on the above reasons, an atmospheric vacuum process of the refinery plant is also forced to make corresponding changes: for the refinery plant which may obtain light crude oil (API>34) and medium crude oil (API=34~20), the "three-tower two-furnace" is a typical atmospheric vacuum normal process. However, if the refinery plant may only obtain the heavy crude oil (API=10-20) or even the superheavy crude oil (API<10), the atmospheric vacuum system of the refinery plant may be degraded into "one-tower one-furnace", namely: vacuum furnace-→vacuum tower, because there are no light components in this crude oil, it is impossible to distill any products from an atmospheric tower.

In summary, for all refinery plants, no matter whether high-quality crude oil may be obtained, the vacuum tower thereof and the vacuum furnace for heating the raw materials of the vacuum tower are essential key devices. If an extraction rate of light oil from the vacuum tower may be improved and the output of tail oil called as the vacuum residual oil may be reduced, this process may greatly improve the economic benefits of the refinery plant.

As far as China introduces foreign advanced technologies at present, there are two main ways to improve the extraction rate of the vacuum tower. One way is to increase a feeding temperature of the vacuum tower, and generally it is improved from 380~390° C. to 410~420° C. Another way to improve the extraction rate of the vacuum tower is to improve a vacuum degree of the vacuum tower, and it is usually called as vacuum deep extraction. The vacuum degree of the vacuum deep extraction generally reaches 92~97 KPa, and a real boiling point of distillation is about 600° C. Certainly, such measures are taken, and the extraction rate of the vacuum tower may be improved by 5-8%. For the treatment capacity of millions of tons of the raw materials, its economic benefits are significant.

However, the feeding temperature is improved to an edge of a large amount of coking (426° C.), it is risky to the operation of the devices, so the improvement of the feeding temperature of the vacuum tower must be done with caution. To achieve such a high vacuum degree in a vacuum deep extraction, at least three stages of steam injection are required to meet requirements, and this requires a lot of energy.

Based on the above reasons, it is necessary to provide a vacuum tower with a high extraction rate of light oil, milder operating temperature and pressure conditions, and lower energy consumption.

SUMMARY

A main purpose of the disclosure is to provide a vacuum rectification tower with a satellite-type tower kettle and a vacuum rectification method for atmospheric pressure residual oil, as to solve problems in the prior art that an extraction rate of light oil is low, or operating conditions are harsh and energy consumption is huge while atmospheric pressure residual oil is vacuum-rectified in the vacuum tower.

In order to achieve the above purpose, according to one aspect of the disclosure, a vacuum rectification tower with a satellite-type tower kettle is provided, and it includes: a satellite-surrounded vacuum tower kettle, including a main tower kettle and a plurality of sub-reactors arranged outside the main tower kettle in a satellite-surrounded mode; the main tower kettle is provided with a first outlet and a plurality of spray inlets, and a top portion of the main tower kettle has an opening; the sub-reactor is provided with a second outlet and a first inlet, the spray inlets are connected with the second outlets of each sub-reactor in a one-to-one correspondence, and the first outlet is connected with the first inlets; herein, a spray direction of each spray inlet may be adjusted or the spray directions of at least two spray inlets are crossed, and a volume of the sub-reactor is less than a volume of the main tower kettle; and a rectifying section, located above the main tower kettle, and communicated with the top opening of the main tower kettle, herein a top portion of the rectifying section is provided with a light component outlet.

Further, the main tower kettle is further internally provided with a non-submerged impinging stream assembly, and the non-submerged impinging stream assembly is arranged in the spray direction of each spray inlet, and used for performing non-submerged impacting, cavitation and shearing on a sprayed material from the spray inlet.

Further, each of the first outlets is connected with the first inlet by a circulation pipeline, and the circulation pipeline is further provided with a forced circulation pump.

Further, the volume of the sub-reactor is marked as V1, and the volume of the main tower kettle is marked as V2, $V1/V2=1/20 \sim 1/10000$.

Further, the sub-reactor is a pressurized micro-reactor with a volume$\leq 0.025$ m$^3$ and an inner diameter$<0.1$ m or an atmospheric micro-reactor with a volume$\leq 0.1$ m$^3$ and an inner diameter$<0.1$ m.

Further, the vacuum rectification tower with the satellite-type tower kettle further including: a vacuum pump, connected with the light component outlet; and a waste gas tank, having a light component inlet, herein the light component inlet is connected with an outlet of the vacuum pump.

Further, the waste gas tank also has a liquid-phase component outlet and a waste gas outlet, and the waste gas outlet is connected with the first inlets of at least part of the sub-reactors.

Further, a side portion of the rectifying section also has a side-line extraction outlet, the side-line extraction outlet includes a gasoline fraction extraction outlet, a diesel fraction extraction outlet and a residual fraction oil extraction outlet which are arranged from top to bottom, and the vacuum rectification tower with the satellite-type tower kettle further includes: a gasoline storage tank, connected with the gasoline fraction extraction outlet; a diesel storage tank, connected with the diesel fraction extraction outlet; and a residual fraction oil storage tank, connected with the residual fraction oil extraction outlet.

Further, an outlet of the residual fraction oil storage tank is also connected with the first inlets of at least part of the sub-reactors.

Further, further including a hydrogen supply unit, herein the hydrogen supply unit is connected with the first inlets of at least part of the sub-reactors.

Further, a bottom portion of the main tower kettle also has a vacuum residual oil discharge port.

Further, the spray direction of any one of the spray inlets is crossed with at least one spray direction of the remaining spray inlets.

Further, the non-submerged impinging stream assembly includes: a shell, herein an inner cavity of the shell is used to provide a non-submerged impact site, and the shell includes a plurality of spray channels arranged in a one-to-one correspondence with each of the spray inlets, and outer walls of the spray channels are provided with a plurality of first hole structures, and an axial direction of the first hole structures has an included angle with an axial direction of the spray channels.

Further, one end, away from the spray inlet, of the spray channel is provided with an impact bottom plate; or a radial cross-sectional area of the spray channel is gradually decreased along a direction away from the spray inlet, and the other end of the spray channel is closed.

Further, the non-submerged impinging stream assembly is arranged in a position, close to the rectifying section, at a top end of the main tower kettle.

Further, the sub-reactor is a tubular structure, and the interior of the sub-reactor is further provided with a plurality of pipeline cavitation plates, and the pipeline cavitation plates are provided with a plurality of second hole structures.

Further, the main tower kettle successively includes a tower kettle body, a stripping section and a feeding section from bottom to top, the spray inlet is arranged at the feeding section, the first outlet is arranged at the tower kettle body, and the feeding section is further provided with an atmospheric pressure residual oil inlet.

According to another aspect of the disclosure, a vacuum rectification method for atmospheric pressure residual oil is further provided, the above vacuum rectification tower with the satellite-type tower kettle is used to treat the atmospheric pressure residual oil, and a treatment process includes the following steps: step S1, atmospheric pressure residual oil is fed into at least one sub-reactor through the first inlet, and then further fed into the main tower kettle in a spray state through the spray inlet; oil in the main tower kettle is discharged from the first outlet, and circulated into at least one sub-reactor so as to feed into the main tower kettle again in the spray state through the spray inlet, and circulated for multiple times, herein the sub-reactor into which the atmospheric pressure residual oil is fed and the sub-reactor into which the oil in the main tower kettle is circulated are the same or different; and step S2, gas-phase light oil obtained in the step S1 is enabled to enter the rectifying section for vacuum rectification, to obtain a gasoline fraction, a diesel fraction, a residual fraction and a light component gas.

Further, in the step S1, after the atmospheric pressure residual oil and the circulated oil in the main tower kettle are fed from the spray inlet, it is enabled to undergo non-submerged impacting, cavitation and shearing through the non-submerged impinging stream assembly.

Further, a tower top vacuum degree of the rectifying section is 2~5 kPa, a reaction temperature in the main tower kettle is 350~400° C., a feeding temperature of the atmospheric pressure residual oil is 380~400° C., and a material residence time in the main tower kettle is 0.5~1 h.

Further, in the step S1, the number of oil cycles in the main tower kettle is 10~100.

Further, in the step S1, while the atmospheric pressure residual oil and the oil in the main tower kettle are fed, at least one sub-reactor is selected for feeding hydrogen, and a volume ratio of the hydrogen to the atmospheric pressure residual oil is 80~200:1.

Further, the step S2 further includes, after the light component gas is obtained, the light component gas is fed into the waste gas tank, to obtain a liquefied gas and a waste gas; and the waste gas is circulated into at least one sub-reactor.

Further, in the step S1, the atmospheric pressure residual oil is simultaneously fed into the main tower kettle from the atmospheric pressure residual oil inlet arranged at the feeding section.

The disclosure provides a vacuum rectification tower with a satellite-type tower kettle, and it specifically includes a satellite-surrounded vacuum tower kettle and a rectifying section. In addition to the main tower kettle, the satellite-surrounded vacuum tower kettle further includes a plurality of small-volume sub-reactors arranged outside the main tower kettle in the satellite-surrounded mode. In the process of performing vacuum rectification on the atmospheric pressure residual oil, the raw material of the atmospheric pressure residual oil may enter through the sub-reactors, and the residual oil entering the vacuum tower kettle is circulated for many times through a plurality of the sub-reactors, or the fresh atmospheric pressure residual oil and the oil returned from the first outlet of the main tower kettle may be mixed in the sub-reactors and sent into the main tower kettle, as to form a circulating state. On the one hand, continuous circulation of the fresh atmospheric pressure residual oil and the oil in the kettle may use a fastest and easiest way to make the material meet process requirements in mass transfer, heat transfer and energy transfer, and it is an efficient reactor. On the other hand, after the fresh atmospheric pressure residual oil and the oil in the kettle enter the spray inlets through the sub-reactors, because the spray direction of each spray inlet may be adjusted or the spray directions of at least two spray inlets are crossed, an actual spray process may make at least two strands of the materials collide after being sprayed. In addition, this collision is a non-submerged impact process because a liquid-phase is performed in a gas-phase environment, so a certain hydrogen transfer reaction may occur, and it promotes the atmospheric pressure residual oil and the circulated oil to undergo a shallow lightening reaction, thereby it has a very good effect of improving the quality and extraction rate of the hydrogen component of the vacuum rectification tower. The atmospheric pressure residual oil entering the vacuum tower kettle and the tower kettle oil are continuously circulated, collided and flashed through the sub-reactors, the light oil in the gas-phase is produced and enters the upper rectifying section for the vacuum rectification, as to separate the gasoline fraction, the diesel fraction and the residual fraction, and the light component gas-phase is produced at the top of the rectification tower.

The above vacuum rectification tower with the satellite-type tower kettle is used to treat the atmospheric pressure residual oil, and the extraction rate of the light oil may be effectively improved under relatively mild temperature and pressure environment, and it is a breakthrough change for energy consumption-benefit data.

BRIEF DESCRIPTION OF THE DRAWINGS

Drawings of the description for constituting a part of the present application are used to provide further understanding of the disclosure, exemplary embodiments of the disclosure and descriptions thereof are used to explain the disclosure, and do not constitute improper limitation to the disclosure. In the drawings.

Herein, the above drawings include the following reference signs:
10. Satellite-surrounded vacuum tower kettle; 11. Main tower kettle; 12. Sub-reactor; 13. Non-submerged impinging stream assembly; 14. Forced circulation pump; 111. Tower kettle body; 112. Stripping section; 113. Feeding section; 20. Rectifying section; 30. Vacuum pump; 40. Waste gas tank; 50. Gasoline storage tank; 60. Diesel storage tank; 70. Residual fraction storage tank; 80. Balance tank; 90. First delivery pump; 100. Second delivery pump; and 110. Liquefied gas tank.

DETAILED DESCRIPTION OF THE EMBODIMENTS

It should be noted that embodiments in the present application and features in the embodiments may be combined with each other in the case without conflicting. The disclosure is described in detail below with reference to drawings and in combination with the embodiments.

In the prior art, there are problems that an extraction rate of light oil is low, or operating conditions are harsh and energy consumption is hug while atmospheric pressure residual oil is subjected to vacuum rectification in a vacuum tower. In addition, in the vacuum tower of a general refinery plant, a vacuum tower kettle has a diameter of about 5~8 meters and a volume of 25~250 cubic meters, and a function of the traditional vacuum tower kettle is only a container for receiving vacuum residual oil. In order to improve the light oil extraction rate of the vacuum tower, the vacuum tower kettle needs to assume a function of a reactor. However, the super-volume vacuum tower kettle is used as the reactor, and there are serious imbalance phenomena in heat transfer, mass transfer and momentum transfer of materials in the kettle.

Figure 1:
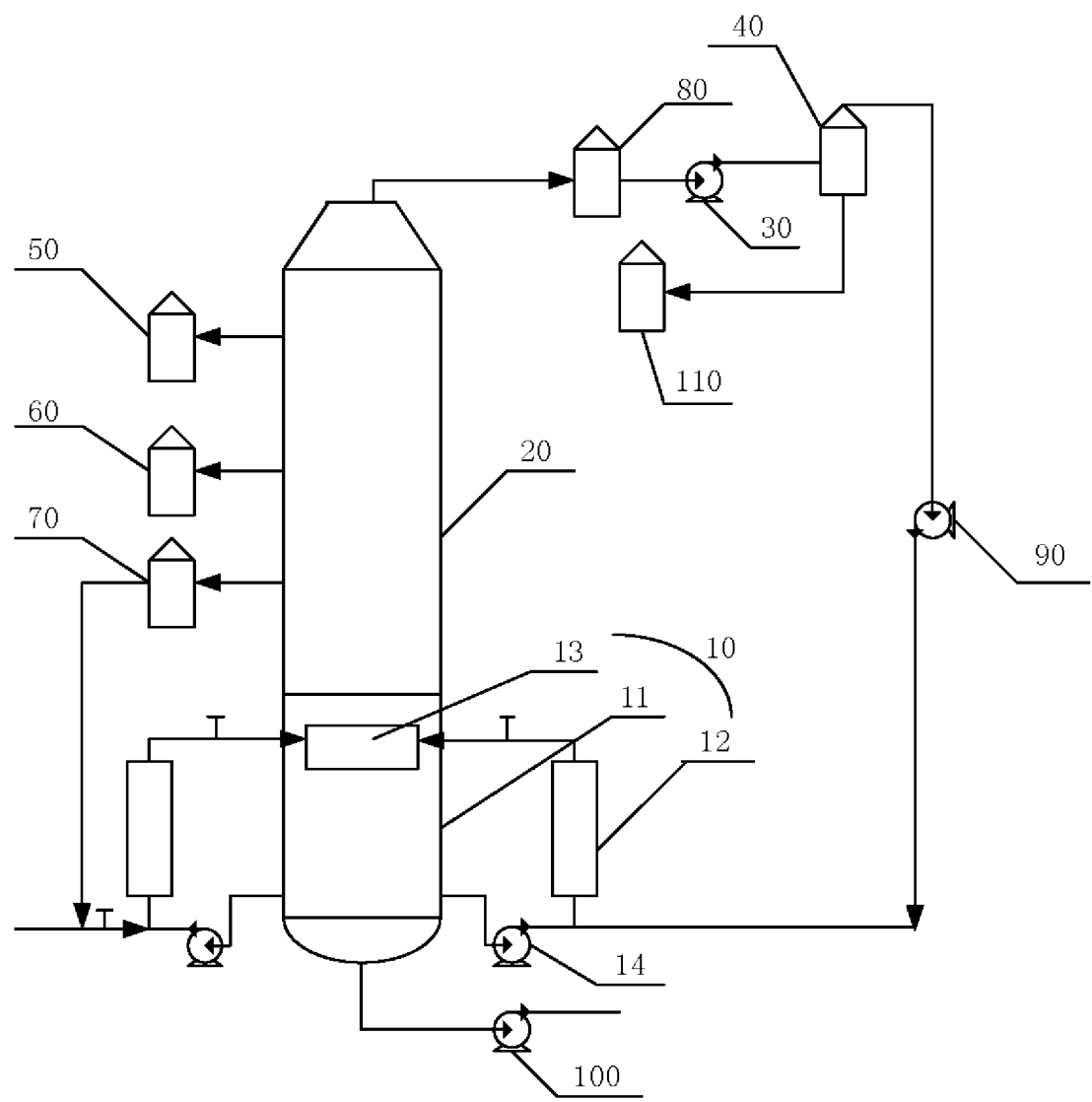
FIG. 1 shows a structure schematic diagram of a vacuum rectification tower with a satellite-type tower kettle according to an embodiment of the disclosure.
Figure 2:
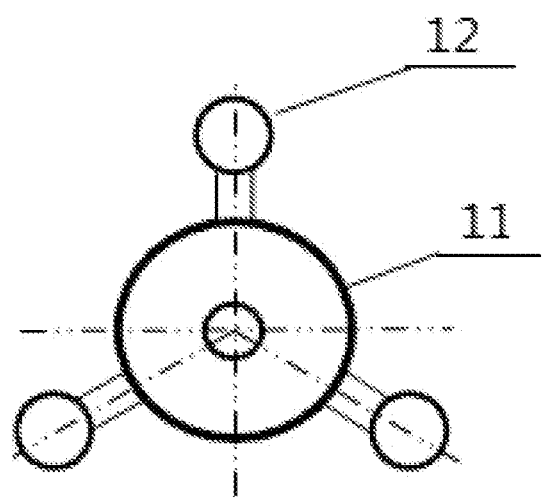
FIG. 2 shows a structure schematic diagram of a satellite-surrounded vacuum tower kettle in the vacuum rectification tower with the satellite-type tower kettle according to an embodiment of the disclosure.
Figure 3:
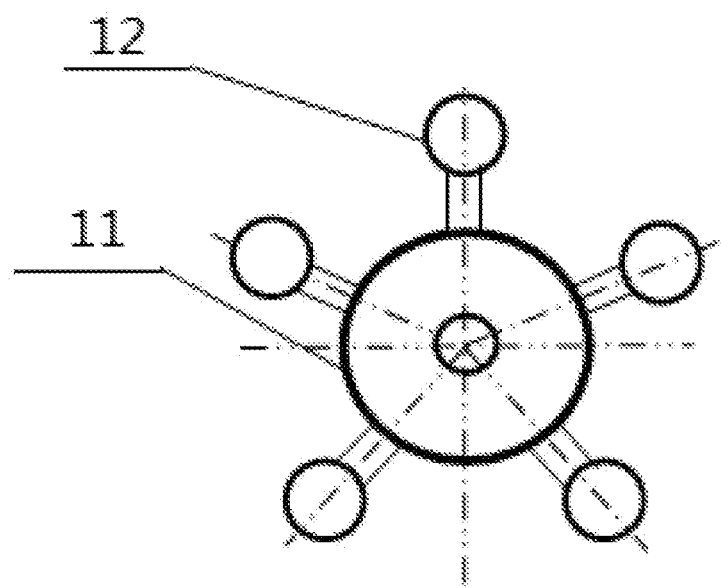
FIG. 3 shows a structure schematic diagram of the satellite-surrounded vacuum tower kettle in the vacuum rectification tower with the satellite-type tower kettle according to another embodiment of the disclosure.

In order to solve the above problems, the disclosure provides a vacuum rectification tower with a satellite-type tower kettle, as shown in FIG. 1, it includes: a satellite-surrounded vacuum tower kettle 10 and a rectifying section 20; the satellite-surrounded vacuum tower kettle 10 includes a main tower kettle 11 and a plurality of sub-reactors 12 (as shown in FIGS. 2 and 3) arranged outside the main tower kettle 11 in a satellite-surrounded mode; the main tower kettle 11 is provided with a first outlet and a plurality of spray inlets, and a top portion of the main tower kettle 11 has an opening; the sub-reactor 12 is provided with a second outlet and a first inlet, the spray inlets are connected with the second outlets of each sub-reactor 12 in a one-to-one correspondence, and the first outlet is connected with the first inlets; herein, a spray direction of each spray inlet may be adjusted or the spray directions of at least two spray inlets are crossed, and a volume of the sub-reactor 12 is less than a volume of the main tower kettle 11; and the rectifying section 20 is located above the main tower kettle 11, and communicated with the top opening of the main tower kettle 11, and a top portion of the rectifying section 20 is provided with a light component outlet.

The disclosure provides a vacuum rectification tower with a satellite-type tower kettle, and it specifically includes a satellite-surrounded vacuum tower kettle and a rectifying section. In addition to the main tower kettle, the satellite-surrounded vacuum tower kettle further includes a plurality of small-volume sub-reactors arranged outside the main tower kettle in the satellite-surrounded mode. In the process of performing vacuum rectification on the atmospheric pressure residual oil, the raw material of the atmospheric pressure residual oil may enter through the sub-reactors, and the residual oil entering the vacuum tower kettle is circulated for many times through a plurality of the sub-reactors, or the fresh atmospheric pressure residual oil and the oil returned from the first outlet of the main tower kettle may be mixed in the sub-reactors and sent into the main tower kettle, as to form a circulating state. On the one hand, continuous circulation of the fresh atmospheric pressure residual oil and the oil in the kettle may use a fastest and easiest way to make the material meet process requirements in mass transfer, heat transfer and energy transfer, and it is an efficient reactor. On the other hand, after the fresh atmospheric pressure residual oil and the oil in the kettle enter the spray inlets through the sub-reactors, because the spray direction of each spray inlet may be adjusted or the spray directions of at least two spray inlets are crossed, an actual spray process may make at least two strands of the materials collide after being sprayed. In addition, this collision is a non-submerged impact process because a liquid-phase is performed in a gas-phase environment, so a certain hydrogen transfer reaction may occur, and it promotes the atmospheric pressure residual oil and the circulated oil to undergo a shallow lightening reaction, thereby it has a very good effect of improving the quality and extraction rate of the hydrogen component of the vacuum rectification tower. The atmospheric pressure residual oil entering the vacuum tower kettle and the tower kettle oil are continuously circulated, collided and flashed through the sub-reactors, the light oil in the gas-phase is produced and enters the upper rectifying section for the vacuum rectification, as to separate the gasoline fraction, the diesel fraction and the residual fraction, and the light component gas-phase is produced at the top of the rectification tower.

The above vacuum rectification tower with the satellite-type tower kettle is used to treat the atmospheric pressure residual oil, and the extraction rate of the light oil may be effectively improved under relatively mild temperature and pressure environment, and it is a breakthrough change for energy consumption-benefit data.

About the hydrogen transfer reaction, a part of the heavy oil in the atmospheric pressure residual oil may transfer hydrogen carried by itself to other components during the impact process, and the hydrogen transfer in a non-hydrogen state is completed, so that a part of the heavy oil is heavier, and the other part of the heavy oil is lightened. Especially in the processes of multiple cycles, spray, and impact of the sub-reactors, this hydrogen transfer reaction is more apparent, thereby the shallow lightening of the atmospheric pressure residual oil and the circulated oil is achieved, so that the satellite-surrounded vacuum tower kettle both has a function of receiving the materials and a function of the reactor.

In order to further improve a degree of the lightening of the atmospheric pressure residual oil and the circulated oil, in a preferred implementation mode, as shown in FIG. 1, the main tower kettle 11 is further internally provided with a non-submerged impinging stream assembly 13, and the non-submerged impinging stream assembly 13 is arranged in the spray direction of each spray inlet, and used for performing non-submerged impacting, cavitation and shearing on a sprayed material from the spray inlet. This assembly is used, and the atmospheric pressure residual oil sprayed from the spray inlet and the oil circulated into the sub-reactors may generate the stronger non-submerged impact, cavitation and shearing in the non-submerged impinging stream assembly 13, thereby the reaction efficiency is further enhanced, and the degree of lightening is improved, so the extraction rate of the light oil is further improved. Preferably, each first outlet is connected with the first inlet by a circulation pipeline, and the circulation pipeline is further provided with a forced circulation pump 14. The forced circulation pump 14 may be used to more stably circulate the oil in the main tower kettle, and provide circulation kinetic energy, and even provide kinetic energy for the spraying of the materials in the sub-reactors.

In a preferred implementation mode, a volume of the sub-reactor 12 is marked as V1, and a volume of the main tower kettle 11 is marked as V2, V1/V2=$\frac{1}{20}$~$\frac{1}{10000}$. On the one hand, this is more beneficial to mixing of the materials in the sub-reactors, and on the other hand, it is also beneficial to improve the treatment efficiency. In an actual application process, the volume of the sub-reactor may be adjusted according to a treatment scale. For example, in a laboratory scale, V1/V2 is more suitable at $\frac{1}{20}$~$\frac{1}{100}$. In an industrial scale, a value of V1/V2 is lower, preferably $\frac{1}{100}$~$\frac{1}{10000}$. More preferably, the sub-reactor 12 is a pressurized micro-reactor with a volume≤0.025 m$^3$ and an inner diameter<0.1 m or an atmospheric micro-reactor with a volume≤0.1 m$^3$ and an inner diameter<0.1 m. The above micro-reactor is used as the sub-reactor, and imbalance problems of the material may be more effectively solved, so that the material is more efficient and balanced in aspects of mass transfer, heat transfer and energy transfer, and it is beneficial to further improve an effect of a lightening reaction. In actual production, the specific number of the sub-reactors 12 may be adjusted according to the treatment capacity, and there is at least one.

In a preferred implementation mode, the above vacuum rectification tower with the satellite-type tower kettle further includes: a vacuum pump 30, connected with the light component outlet; a waste gas tank 40, having a light component inlet, herein the light component inlet is connected with an output of the vacuum pump 30. In this way, the vacuum pump 30 may provide a vacuum environment to the rectifying section 20 and the main tower kettle 11, and also promote a light gas obtained by impact and flash to separate different fraction oil in the rectifying section, and the waste gas tank 40 may be used for collecting the light component gas discharged from the top of the rectifying section 20.

More preferably, the waste gas tank 40 also has a liquid-phase component outlet and a waste gas outlet, and the waste gas outlet is connected with the first inlet of at least part of the sub-reactors 12. After rectification is completed in the rectifying section 20, components discharged from the light component outlet usually include dry gases such as H2 (if hydrogenated), CO, CO2, CH4, C2 and other non-condensable gases at a room temperature, as well as some of mostly condensed C3, C4 and a small amount of C5 under the room temperature. After being collected by the waste gas tank 40, its non-condensable gas components H2 (if hydrogenated), CO, CO2, and CH4, and a small amount of non-condensed C3, C4 and other components may be returned to such as the main tower kettle 11 through at least part of the sub-reactors 12. In this way, the waste gas may be used as a return gas for gas stripping, instead of water steam stripping (in order to produce more gas-phases in an existing vacuum tower, a small amount of water is added during feeding, and the water becomes steam after entering the vacuum tower and escapes from liquid at a high speed, and while the water steam comes out, a lot of light components of hydrocarbons are brought out, and the extraction rate of the vacuum tower is increased), a treatment capacity of waste liquid generated by the water steam may be reduced, and the extraction rate of the vacuum rectification tower is further increased. At the same time, according to Dalton's law, the return of the waste gas reduces an oil-gas partial pressure greater than C5 hydrocarbons, and accordingly plays a role in stabilizing a pressure in a device. In addition, low-carbon hydrocarbons such as methane in the waste gas may participate in the reaction in the sub-reactors again. Thereby the amount of the low-carbon hydrocarbons such as the methane is reduced. In addition, as shown in FIG. 1, a balance tank 80 is also arranged in a pipeline by which the light component inlet is connected with the vacuum pump 30, and used for maintaining the stability of the vacuum environment. A first delivery pump 90 is also arranged in a pipeline by which the waste gas outlet is connected with at least part of the sub-reactors 12, and used for providing power.

In order to collect various fraction oil separated by the rectifying section 20, in a preferred implementation mode, a side portion of the above rectifying section 20 also has a side-line extraction outlet, the side-line extraction outlet includes a gasoline fraction extraction outlet, a diesel fraction extraction outlet and a residual fraction oil extraction outlet which are arranged from top to bottom, and the vacuum rectification tower with the satellite-type tower kettle further includes: a gasoline storage tank 50, connected with the gasoline fraction extraction outlet; a diesel storage tank 60, connected with the diesel fraction extraction outlet; and a residual fraction oil storage tank 70, connected with the residual fraction oil extraction outlet.

In a preferred implementation mode, as shown in FIG. 1, an outlet of the residual fraction oil storage tank 70 is also connected with the first inlets of at least part of the sub-reactors 12. In this way, a part of the participating fraction oil (usually the fraction oil at 350~500° C.) may be returned to the sub-reactors, and then enter the main tower kettle 11 again for reaction and vacuum rectification.

As mentioned above, in the non-submerged impact process, the atmospheric pressure residual oil and the circulated oil may undergo a certain degree of a hydrogen transfer reaction in a non-hydrogen state, and a purpose of shallow lightening is achieved. Certainly, in order to further improve a lightening effect, in a preferred implementation mode, the above vacuum rectification tower with the satellite-type tower kettle further includes a hydrogen supply unit, the hydrogen supply unit is connected with first inlets of at least part of the sub-reactors 12. In this way, new hydrogen may be put into a process of a lightening reaction, as to promote the atmospheric pressure residual oil and the circulated oil to further undergo the lightening reaction in a hydrogen state. In an actual application process, a heating unit may be arranged on a hydrogen supply flow path, and used for heating the hydrogen in advance before it enters the sub-reactors 12.

After multiple cycles, the vacuum residual oil may be accumulated at the bottom of the main tower kettle 11. Preferably, a bottom portion of the main tower kettle 11 also has a vacuum residual oil discharge port for regularly discharging the vacuum residual oil. As shown in FIG. 1, a pipeline in which the vacuum residual oil discharge port at the bottom portion of the main tower kettle 11 is located is also provided with a second delivery pump 100 for stably discharging the vacuum residual oil.

In order to make the atmospheric pressure residual oil and the circulated oil more fully impact, flash, and react, in a preferred implementation mode, the spray direction of any one of the spray inlets is crossed with at least one spray direction of the remaining spray inlets. In this way, the non-submerged impact may occur for each strand of the incoming sprayed material, thereby the lightening effect is further improved.

In order to further enhance the non-submerged impact process, in a preferred implementation mode, the non-submerged impinging stream assembly 13 includes: a shell, herein an inner cavity of the shell is used to provide a non-submerged impact site, and the shell includes a plurality of spray channels arranged in a one-to-one correspondence with each of the spray inlets, and outer walls of the spray channels are provided with a plurality of first hole structures, and an axial direction of the first hole structures has an included angle with an axial direction of the spray channels. In this way, after the materials in each sub-reactor 12 enter the main tower kettle 11, they may all be impacted in the spray channels, and secondary fluid generated after the impact enters the first hole structures of the spray channels. Because the axial direction of the first hole structures has the included angle with the axial direction of the spray channels, the shearing and cavitation may be formed to the secondary fluid, as to further enhance the non-submerged impact effect and improve the lightening reaction effect. After the impact, shearing, and cavitation are completed, the lightening components are flash-evaporated to form a gas, and it enters the rectifying section 20 to complete fraction separation.

More preferably, one end, away from the spray inlet, of the spray channel is provided with an impact bottom plate; or a radial cross-sectional area of the spray channel is gradually decreased along a direction away from the spray inlet, and the other end of the spray channel is closed. Such a configuration is beneficial to further improve the impact effect, thereby the reaction efficiency is further improved, and the extraction rate of the light oil is increased.

About the non-submerged impinging stream assembly 13, it may also be arranged with reference to records in a Chinese patent 201911175767.7, as long as it may achieve the non-submerged impacting, shearing, and cavitation of the sprayed material of the sub-reactors 12, and it is not repeatedly described here.

During a continuous cycle operation process, a part of the liquid-phase material is always retained in the main tower kettle 11, so that the sprayed atmospheric pressure residual oil and circulated oil may perform the non-submerged impact in a gas environment. In a preferred implementation mode, the non-submerged impinging stream assembly 13 is arranged in a position, close to the rectifying section 20, at a top end of the main tower kettle 11. In this way, in addition to improving the non-submerged impact effect, it may also promote the gas of the lightening components formed by the impact, reaction, and flash to enter the rectifying section 20 in time.

In a preferred implementation mode, the sub-reactor 12 is a tubular structure, and the interior of the sub-reactor 12 is further provided with a plurality of pipeline cavitation plates, and the pipeline cavitation plates are provided with a plurality of second hole structures. The pipeline cavitation plates are used to further advantageously enhance the mixing of the materials in the sub-reactors 12, thereby the lightening reaction effect is further improved, and the extraction rate of the light oil is increased. A specific configuration mode of the pipeline cavitation plate may also be set with reference to records in the Chinese patent 201911175767.7, and it is not repeatedly described here.

Figure 4:
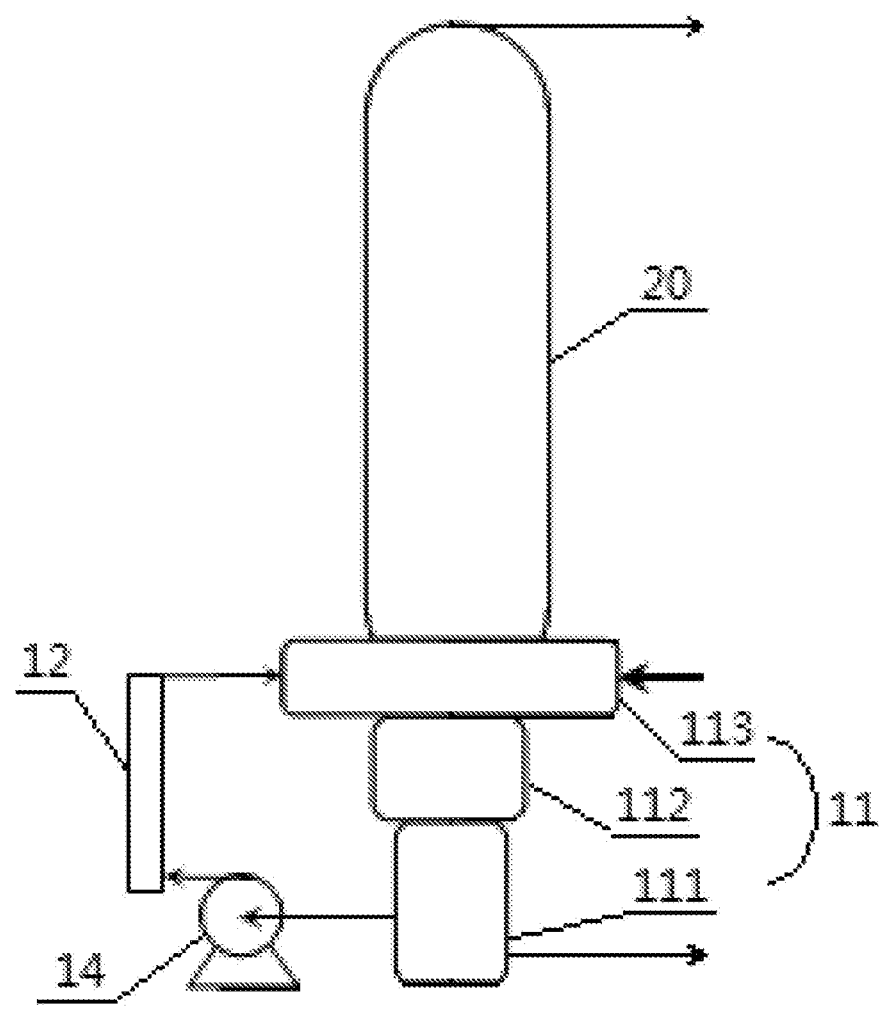
FIG. 4 shows a structure schematic diagram of the vacuum rectification tower with the satellite-type tower kettle according to another embodiment of the disclosure.

In order to save costs, the above vacuum rectification tower with satellite-type tower kettle provided by the disclosure may also be modified on the basis of the existing vacuum rectification tower. For example, as shown in FIG. 4, the main tower kettle 11 successively includes a tower kettle body 111, a stripping section 112 and a feeding section 113 from bottom to top, the spray inlet is arranged at the feeding section 113, the first outlet is arranged at the tower kettle body 111, and the feeding section 113 is further provided with an atmospheric pressure residual oil inlet. Such a configuration is equivalent to adding components such as the sub-reactors 12 and the optional non-submerged impinging stream assembly on the basis of the existing vacuum rectification tower, and the circulated oil of the sub-reactors 12 may cross the stripping section (only about 4 tower plates), and enter from the tower plates (the feeding section 113, namely a largest place of a tower diameter) from which the raw materials are input. During this period, the fresh atmospheric pressure residual oil may also only enter through the atmospheric pressure residual oil inlet, and the sub-reactors 12 perform the circulation of the oil entering the tower kettle body 111.

It should be noted that the specific number of the sub-reactors 12 may be designed according to the volume of the main tower kettle 11, the volume of the sub-reactor 12, the number of the cycles and the like, as long as it may reach the corresponding number of the cycles under corresponding residence time and corresponding process conditions. Certainly, a certain standby capacity may also be considered, this should be understood by those skilled in the art.

Preferably, a liquid-phase component outlet of the waste gas tank 40 is connected with a liquefied gas tank 110 to collect the components condensed at the room temperature.

According to another aspect of the disclosure, a vacuum rectification method for atmospheric pressure residual oil is further provided, the above vacuum rectification tower with the satellite-type tower kettle is used to treat the atmospheric pressure residual oil, and a treatment process includes the following steps: step S1, atmospheric pressure residual oil is fed into at least one sub-reactor 12 through the first inlet, and then further fed into the main tower kettle 11 in a spray state through the spray inlet; oil in the main tower kettle 11 is discharged from the first outlet, and circulated into at least one sub-reactor 12 so as to feed into the main tower kettle 11 again in the spray state through the spray inlet, and circulated for multiple times, herein the sub-reactor 12 into which the atmospheric pressure residual oil is fed and the sub-reactor 12 to which the oil in the main tower kettle 11 is circulated are the same or different; and step S2, gas-phase light oil obtained in the step S1 is enabled to enter the rectifying section 20 for vacuum rectification, to obtain a gasoline fraction, a diesel fraction, a residual fraction and a light component gas.

The above method is used, the raw material of the atmospheric pressure residual oil may enter through the sub-reactors, and the residual oil entering the vacuum tower kettle is circulated for many times through a plurality of the sub-reactors, or the fresh atmospheric pressure residual oil and the oil returned from the first outlet of the main tower kettle may be mixed in the sub-reactors and sent into the main tower kettle, as to form a circulating state. On the one hand, continuous circulation of the fresh atmospheric pressure residual oil and the oil in the kettle may use a fastest and easiest way to make the material meet process requirements in mass transfer, heat transfer and energy transfer, and it is an efficient reactor. On the other hand, after the fresh atmospheric pressure residual oil and the oil in the kettle enter the spray inlets through the sub-reactors, because the spray direction of each spray inlet may be adjusted or the spray directions of at least two spray inlets are crossed, an actual spray process may make at least two strands of the materials collide after being sprayed. In addition, this collision is a non-submerged impact process because a liquid-phase is performed in a gas-phase environment, so a certain hydrogen transfer reaction may occur, and it promotes the atmospheric pressure residual oil and the circulated oil to undergo a shallow lightening reaction, thereby it has a very good effect of improving the quality and extraction rate of the hydrogen component of the vacuum rectification tower. The atmospheric pressure residual oil entering the vacuum tower kettle and the tower kettle oil are continuously circulated, collided and flashed through the sub-reactors, the light oil in the gas-phase is produced and enters the upper rectifying section for the vacuum rectification, as to separate the gasoline fraction, the diesel fraction and the residual fraction (usually the fraction oil at 350~500° C.), and the light component gas-phase is produced at the top of the rectification tower. The above vacuum rectification tower with the satellite-type tower kettle is used to treat the atmospheric pressure residual oil, and the extraction rate of the light oil may be effectively improved under relatively mild temperature and pressure environment, and it is a breakthrough change for energy consumption-benefit data.

In the actual treatment process, the material circularly input by the sub-reactors is the oil (residual oil) in the main tower kettle, one or several sub-reactors may also serve as the input of the fresh material of the atmospheric pressure residual oil heated by the vacuum furnace, these sub-reactors may also circularly input the material in the tower kettle at the same time. Certainly, their circulation volume may be lower than the sub-reactors without new material input.

In order to further enhance the effect of the lightening reaction, in a preferred implementation mode, in the step S1, after the atmospheric pressure residual oil and the circulated oil in the main tower kettle 11 are fed from the spray inlet, it is enabled to undergo non-submerged impacting, cavitation and shearing through the non-submerged impinging stream assembly 13.

Preferably, an aperture of the above spray inlet is 1~50 mm, and a flow rate of the liquid material entering the spray inlet is 5~100 m/s.

Factors such as energy consumption and light oil extraction rate are comprehensively considered, in a preferred implementation mode, a tower top vacuum degree of the rectifying section 20 is 2~5 kPa (slightly negative pressure), and a reaction temperature in the main tower kettle 11 is 350400° C., a feed temperature of the atmospheric pressure residual oil is 380400° C., and a material residence time in the main tower kettle 11 is 0.5~1 h.

In order to make the lightening effect of the atmospheric pressure residual oil better, and comprehensively improve the balance of the materials and improve the treatment efficiency, in a preferred implementation mode, in the step S1, the number of oil cycles in the main tower kettle 11 is 100~300 times/h. Certainly, it should be noted that the number of the cycles is for the vacuum rectification of the atmospheric pressure residual oil. For other different raw materials and different reaction conditions, the number of the cycles may also be adjusted according to actual conditions. Certainly, according to a spray speed of the material, the number of the cycles may also be appropriately changed. While the spray speed is fast, the number of the cycles may be appropriately reduced, and the reverse is also true.

In a preferred implementation mode, in the step S1, while the atmospheric pressure residual oil and the oil in the main tower kettle 11 are fed, at least one sub-reactor 12 is selected for feeding hydrogen, and a volume ratio of the hydrogen to the atmospheric pressure residual oil is 80~200:1. In this way, new hydrogen may be put into the process of the lightening reaction, as to promote the atmospheric pressure residual oil and circulated oil to further undergo the lightening reaction in the hydrogen state.

Preferably, the step S2 further includes, after the light component gas is obtained, the light component gas is fed into the waste gas tank 40, to obtain a liquefied gas and a waste gas through liquidation at a room temperature (20-30° C.); and the waste gas is circulated into at least one sub-reactor 12. In this way, the waste gas may be used as a return gas for gas stripping, instead of water steam stripping, a treatment capacity of waste liquid generated by the water steam may be reduced, and the extraction rate of the vacuum rectification tower is further increased. At the same time, according to Dalton's law, the return of the waste gas reduces an oil-gas partial pressure greater than C5 hydrocarbons, and accordingly stabilizes an operating pressure in a device. In addition, low-carbon hydrocarbons such as methane in the waste gas may participate in the reaction in the sub-reactors again, thereby the amount of the low-carbon hydrocarbons such as the methane is reduced.

While the hydrogen is fed, the new hydrogen entering the main tower kettle participates in the tower kettle waste gas after one time of the reaction, and then enters the tower kettle again through a certain sub-reactor, it participates in the continuous circulation process, until the hydrogen is completely combined with the residual oil. Therefore, the above hydrogen-oil ratio is actually hydrogen consumption in the lightening process.

More preferably, in the step S1, the atmospheric pressure residual oil is simultaneously fed into the main tower kettle 11 from the atmospheric pressure residual oil inlet arranged at the feeding section 113. In this way, the traditional vacuum rectification tower may be modified to form the vacuum rectification tower of the disclosure, the stripping section 112 and the feeding section 113 thereof are retained, and the sub-reactors 12 and the optional non-submerged impinging stream assembly 13 are additionally arranged, it is beneficial to save the energy consumption. In the actual treatment process, a first vacuum side stream of the traditional vacuum rectification tower may be changed into top extraction to output the gasoline fraction; a second vacuum side stream is changed to output the diesel fraction; and wax oil output of third vacuum side stream and fourth vacuum side stream may be retained as participating in fraction oil output.

The present application is further described in detail below in combination with specific embodiments, and these embodiments should not be interpreted as limiting a scope of protection claimed by the present application.

Embodiment 1

The vacuum rectification tower with the satellite-type tower kettle shown in FIG. 1 of the disclosure is used for treatment, 3 sub-reactors are arranged at a periphery of the main tower kettle of the vacuum rectification tower in a satellite-surrounded mode, and the sub-reactors are 1/20 of a volume of the main tower kettle. A non-submerged imping-ing stream assembly is a shell, an inner cavity thereof is used to provide a non-submerged impact site, and the shell includes a plurality of spray channels arranged in a one-to-one correspondence with each spray inlet, an aperture of the spray inlet is 6~10 mm, a spray flow rate of a liquid material is 8~12 m/s, outer walls of the spray channels are provided with a plurality of first hole structures (an aperture is 1-3 mm), and an axial direction of the first hole structures has an included angle with an axial direction of the spray channels. Each spray channel is crossed in a central position, and one end (equivalent to a middle position of each spray channel inside the shell), away from the spray inlet, of each spray channel is provided with an impact bottom plate. The sub-reactor is a pressurized micro-reactor with a volume≤0.025 m3 and an inner diameter<0.1 m, it is a tubular structure, and the interior thereof is further provided with a plurality of pipeline cavitation plates, and the pipeline cavitation plates are provided with a plurality of second hole structures (an aperture is 1~3 mm).

Raw material: Venezuelan crude oil; treatment capacity: laboratory pilot scale, and the raw material treatment capacity is 3~7 kg/h.

Reaction temperature: 370° C.
Reaction pressure: low vacuum: vacuum degree=2~5 KPa
In an actual operation process, Venezuelan crude oil at a temperature of 365~375° C. enters from one of the sub-reactors, and main tower kettle oil is circulated from the other two sub-reactors, and the number of cycles is 200~300 times/h. In the remaining two sub-reactors, one is fed with hydrogen, and a volume ratio of hydrogen to feedstock oil is 100:1, and the other is recycled to rectify a waste gas in a light component gas.

Actual boiling point of raw materials≈375° C.
Light oil extraction rate: 70%
Extracted light oil fractions: IBP~350° C. (gasoline and diesel fractions): 100%.

Contrast Example 1

An existing vacuum tower of a refinery plant is adopted, and successively includes a vacuum tower kettle, a gas stripping section, a raw material feeding section and a rectifying section from bottom to top. 300,000 tons/a vacuum tower in a certain refinery plant; and raw material: Venezuelan crude oil.

Note: Venezuela is a country with the largest oil reserves in the world, but the Venezuelan crude oil is one of the worst crude oil in the world (API≈10, it belongs to heavy oil or superheavy oil, equivalent to atmospheric pressure residual oil). Generally, the Venezuelan crude oil is imported into China mainly for production of road asphalt.

Therefore, the refinery plant makes the crude oil imported from Venezuela directly enter the vacuum tower for vacuum deep extraction without being treated by a primary tower and an atmospheric tower. Extracted light oil (wax oil) is hydrocracked to obtain light gasoline and diesel oil and fraction oil of <500° C.; and base oil (tail oil) after the extraction of the wax oil is used to produce various asphalts.

Process Parameters:
Device: typical 300,000 tons/a vacuum rectification tower
Raw material treatment capacity: 300 KT/a=37.5 T/h
Reaction temperature: 385° C.
Reaction pressure: high vacuum: vacuum degree=92~94 KPa,
Actual boiling point of raw materials: 520~540° C.
Light oil extraction rate≤50%
Extracted light oil fractions:
IBP-350° C.: 25%; 350~500° C.: 65%; ≥500° C.: 10%.
Contrast Example 1 has harsh temperature and pressure conditions, and 75% of an extracted product is fraction oil higher than 350 degrees, and a lightening effect is not good.

Conclusion: investment-cost-benefit analysis is used to investigate a traditional vacuum tower and a vacuum rectification tower with a satellite-type tower kettle of the disclosure. The latter is overall better than the former, and the light oil extraction rate is 20-50% higher than the extraction rate of the existing vacuum tower. The disclosure proposes an improvement scheme for the existing vacuum tower, and an investment recovery period of the improvement scheme is less than 12 months.

The above are only preferred embodiments of the disclosure, and are not used to limit the disclosure. Various modifications and changes may be made to the disclosure by those skilled in the art. Any modifications, equivalent replacements, improvements and the like made within the spirit and principle of the disclosure should be included in the scope of protection of the disclosure.

What is claimed is:
1. A vacuum rectification tower with a satellite tower kettle, comprising:
a satellite-surrounded vacuum tower kettle, comprising a main tower kettle and a plurality of sub-reactors arranged outside the main tower kettle in a satellite-surrounded mode; the main tower kettle is provided with a plurality of first outlets and a plurality of spray inlets, and a top portion of the main tower kettle has an opening; each sub-reactor is provided with a second outlet and a first inlet, the spray inlets are connected with the second outlets of each sub-reactor in a one-to-one correspondence, and the first outlets are connected with the first inlets in a one-to-one correspondence; wherein, a spray direction of each spray inlet may be adjusted or the spray directions of at least two spray inlets are crossed, and a volume of each sub-reactor is less than a volume of the main tower kettle; and a rectifying section, located above the main tower kettle, and communicated with the top opening of the main tower kettle, wherein a top portion of the rectifying section is provided with a light component outlet.

2. The vacuum rectification tower with the satellite tower kettle according to claim 1, wherein the main tower kettle is further internally provided with a non-submerged impinging stream assembly, and the non-submerged impinging stream assembly is arranged in the spray direction of each spray inlet, and used for performing non-submerged impacting, cavitation and shearing on a sprayed material from the spray inlet.

3. The vacuum rectification tower with the satellite tower kettle according to claim 2, wherein the spray direction of any one of the spray inlets is crossed with at least one spray direction of the remaining spray inlets.

4. The vacuum rectification tower with the satellite tower kettle according to claim 2, wherein the non-submerged impinging stream assembly comprises:
  a shell, wherein an inner cavity of the shell is used to provide a non-submerged impact site, and the shell comprises a plurality of spray channels arranged in a one-to-one correspondence with each of the spray inlets, and outer walls of the spray channels are provided with a plurality of first hole structures, and an axial direction of the first hole structures has an included angle with an axial direction of the spray channels.

5. The vacuum rectification tower with the satellite tower kettle according to claim 4, wherein one end, away from the spray inlet, of the spray channel is provided with an impact bottom plate; or a radial cross-sectional area of the spray channel is gradually decreased along a direction away from the spray inlet, and the other end of the spray channel is closed.

6. The vacuum rectification tower with the satellite tower kettle according to claim 1, wherein each of the first outlets is connected with the first inlet by a circulation pipeline, and the circulation pipeline is further provided with a forced circulation pump.

7. The vacuum rectification tower with the satellite tower kettle according to claim 1, wherein the volume of each sub-reactor is marked as V1, and the volume of the main tower kettle is marked as V2, $V1/V2 = 1/20$ to $1/10000$.

8. The vacuum rectification tower with the satellite tower kettle according to claim 7, wherein each sub-reactor is a pressurized micro-reactor with a volume$\leq 0.025$ m$^3$ and an inner diameter$<0.1$ m or an atmospheric micro-reactor with a volume$\leq 0.1$ m$^3$ and an inner diameter$<0.1$ m.

9. The vacuum rectification tower with the satellite tower kettle according to claim 1, further comprising:
  a vacuum pump, connected with the light component outlet; and
  a waste gas tank, having a light component inlet, wherein the light component inlet is connected with an outlet of the vacuum pump.

10. The vacuum rectification tower with the satellite tower kettle according to claim 9, wherein the waste gas tank also has a liquid-phase component outlet and a waste gas outlet, and the waste gas outlet is connected with the first inlet of at least one of the sub-reactors.

11. The vacuum rectification tower with the satellite tower kettle according to claim 9, wherein a side portion of the rectifying section also has a plurality of side-line extraction outlets, the side-line extraction outlets comprises a gasoline fraction extraction outlet, a diesel fraction extraction outlet and a residual fraction oil extraction outlet which are arranged from top to bottom, and the vacuum rectification tower with the satellite tower kettle further comprises:
  a gasoline storage tank, connected with the gasoline fraction extraction outlet;
  a diesel storage tank, connected with the diesel fraction extraction outlet; and
  a residual fraction oil storage tank, connected with the residual fraction oil extraction outlet.

12. The vacuum rectification tower with the satellite tower kettle according to claim 11, wherein an outlet of the residual fraction oil storage tank is also connected with the first inlets of at least one of the sub-reactors.

13. The vacuum rectification tower with the satellite tower kettle according to claim 9, further comprising a hydrogen supply unit, wherein the hydrogen supply unit is connected with the first inlets of at least one of the sub-reactors.

14. The vacuum rectification tower with the satellite tower kettle according to claim 9, wherein a bottom portion of the main tower kettle also has a vacuum residual oil discharge port.

15. The vacuum rectification tower with the satellite tower kettle according to claim 1, wherein the main tower kettle successively comprises a tower kettle body, a stripping section and a feeding section from bottom to top, the spray inlets are arranged at the feeding section, the first outlets are arranged at the tower kettle body, and the feeding section is further provided with an atmospheric pressure residual oil inlet.

16. A vacuum rectification method for atmospheric pressure residual oil, wherein the vacuum rectification tower with the satellite tower kettle according to claim 1 is used to treat the atmospheric pressure residual oil, and a treatment process comprises the following steps:
  step S1, feeding atmospheric pressure residual oil into at least one sub-reactor through the first inlet, and then further feeding into the main tower kettle in a spray state through at least one of the spray inlets; discharging oil in the main tower kettle from at least one of the first outlets, and circulating into at least one sub-reactor so as to feed into the main tower kettle again in the spray state through the spray inlet, and circulating for multiple times, wherein the sub-reactor into which the atmospheric pressure residual oil is fed and the sub-reactor into which the oil in the main tower kettle is circulated are the same or different; and
  step S2, enabling gas-phase light oil obtained in the step S1 to enter the rectifying section for vacuum rectification, to obtain a gasoline fraction, a diesel fraction, a residual fraction and a light component gas.

17. The vacuum rectification method for the atmospheric pressure residual oil according to claim 16, wherein the main tower kettle is further internally provided with a non-submerged impinging stream assembly, and the non-submerged impinging stream assembly is arranged in the spray direction of each spray inlet, and used for performing non-submerged impacting, cavitation and shearing on a sprayed material from the spray inlet; and in the step S1, after feeding the atmospheric pressure residual oil and the circulated oil in the main tower kettle from the spray inlet, enabling it to undergo non-submerged impacting, cavitation and shearing through the non-submerged impinging stream assembly.

18. The vacuum rectification method for the atmospheric pressure residual oil according to claim 16, wherein a tower top vacuum degree of the rectifying section is 2 to 5 kPa, a reaction temperature in the main tower kettle is 350 to 400° C., a feeding temperature of the atmospheric pressure residual oil is 380 to 400° C., and a material residence time in the main tower kettle is 0.5 to 1 h.

19. The vacuum rectification method for the atmospheric pressure residual oil according to claim 16, wherein in the step S1, while feeding the atmospheric pressure residual oil and the oil in the main tower kettle, selecting at least one sub-reactor for feeding hydrogen, and a volume ratio of the hydrogen to the atmospheric pressure residual oil is 80 to 200:1.

20. The vacuum rectification method for the atmospheric pressure residual oil according to claim 16, wherein the vacuum rectification tower with the satellite tower kettle further comprising:
- a vacuum pump, connected with the light component outlet; and
- a waste gas tank, having a light component inlet, wherein the light component inlet is connected with an outlet of the vacuum pump;
- wherein, the step S2 further comprises, after the light component gas is obtained, feeding the light component gas into the waste gas tank, to obtain a liquefied gas and a waste gas; and circulating the waste gas into at least one sub-reactor.

* * * * *